United States Patent
Lee et al.

(10) Patent No.: US 12,453,517 B2
(45) Date of Patent: Oct. 28, 2025

(54) METHOD FOR PROCESSING NOISE OF BIOMETRIC INFORMATION MEASUREMENT DATA

(71) Applicant: I-SENS, INC., Seoul (KR)

(72) Inventors: David Lee, Seoul (KR); Young Jea Kang, Seoul (KR); Ji Seon Nah, Seoul (KR); Jung Hee Seo, Seoul (KR); Hak Hyun Nam, Seoul (KR)

(73) Assignee: I-SENS, INC., Seoul (KR)

( * ) Notice: Subject to any disclaimer, the term of this patent is extended or adjusted under 35 U.S.C. 154(b) by 874 days.

(21) Appl. No.: 17/631,361

(22) PCT Filed: Mar. 18, 2020

(86) PCT No.: PCT/KR2020/003708
§ 371 (c)(1),
(2) Date: Jan. 28, 2022

(87) PCT Pub. No.: WO2021/025260
PCT Pub. Date: Feb. 11, 2021

(65) Prior Publication Data
US 2022/0330895 A1 Oct. 20, 2022

(30) Foreign Application Priority Data
Aug. 7, 2019 (KR) .................. 10-2019-0095961

(51) Int. Cl.
*A61B 5/00* (2006.01)
*A61B 5/145* (2006.01)

(52) U.S. Cl.
CPC ........ *A61B 5/7203* (2013.01); *A61B 5/14532* (2013.01); *A61B 5/7221* (2013.01); *A61B 2560/0223* (2013.01)

(58) Field of Classification Search
CPC ................ A61B 5/1495; A61B 5/7221; A61B 2560/0223; A61B 5/0024; A61B 5/7203
See application file for complete search history.

(56) References Cited

U.S. PATENT DOCUMENTS

| 2010/0179409 A1 | 7/2010 | Kamath et al. |
| 2012/0108932 A1* | 5/2012 | Roy ..................... A61B 5/4839 600/365 |

(Continued)

FOREIGN PATENT DOCUMENTS

| JP | 2018-187343 | 11/2018 |
| KR | 10-2014-0074664 | 6/2014 |

(Continued)

OTHER PUBLICATIONS

Examination Report No. 3 dated Aug. 16, 2024 for Australian Patent Application No. 2020324823.

(Continued)

*Primary Examiner* — Eric F Winakur
*Assistant Examiner* — Noah M Healy
(74) *Attorney, Agent, or Firm* — WOMBLE BOND DICKINSON (US) LLP

(57) ABSTRACT

The present disclosure relates to a method for processing noise in biometric information measurement data, wherein the method for processing noise in biometric information measurement data, according to one embodiment of the present invention, may comprise the steps of: measuring biometric information by a sensor-transmitter which is placed on a part of a user's body and which measures biometric information of the user; transmitting data on the measured biometric information from the sensor-transmitter to a communication terminal; processing noise in the biometric information data transmitted to the communication terminal; and displaying the noise-processed biometric information data on the communication terminal. According (Continued)

to the present invention, it is possible to obtain accurate biometric information data by processing various types of noise included in biometric information data by using various algorithms to process steps for removing noise in a sequential manner.

10 Claims, 8 Drawing Sheets

(56) References Cited

U.S. PATENT DOCUMENTS

| | | |
|---|---|---|
| 2016/0196235 A1 | 7/2016 | Küster et al. |
| 2019/0076066 A1 | 3/2019 | Ajemba et al. |
| 2019/0110751 A1 | 4/2019 | Lee et al. |

FOREIGN PATENT DOCUMENTS

| | | |
|---|---|---|
| KR | 10-2017-0038351 | 4/2017 |
| KR | 10-2017-0059306 | 5/2017 |
| KR | 10-1895324 | 9/2018 |
| WO | 2014/035672 | 3/2014 |

OTHER PUBLICATIONS

Extended European Search Report dated Jul. 13, 2023 for European Patent Application No. 20849855.0.
International Preliminary Report on Patentability (Chapter I) issued on Feb. 8, 2022 for PCT/KR2020/003708 and its English translation from WIPO (now published as WO 2021/025260).
Examination Report No. 2 dated Mar. 27, 2024 for Australian Patent Application No. 2020324823.
International Search Report for PCT/KR2020/003708 mailed on Jun. 30, 2020 and its English translation from WIPO (now published as WO 2021/025260).
Written Opinion of the International Searching Authority for PCT/KR2020/003708 mailed on Jun. 30, 2020 and its English translation by Google Translate (now published as WO 2021/025260).
Examination Report No. 1 dated Aug. 23, 2023 for Australian Patent Application No. 2020324823.
Examination Report No. 1 dated Sep. 5, 2023 for New Zealand Patent Application 784491.

* cited by examiner

[Fig. 1]
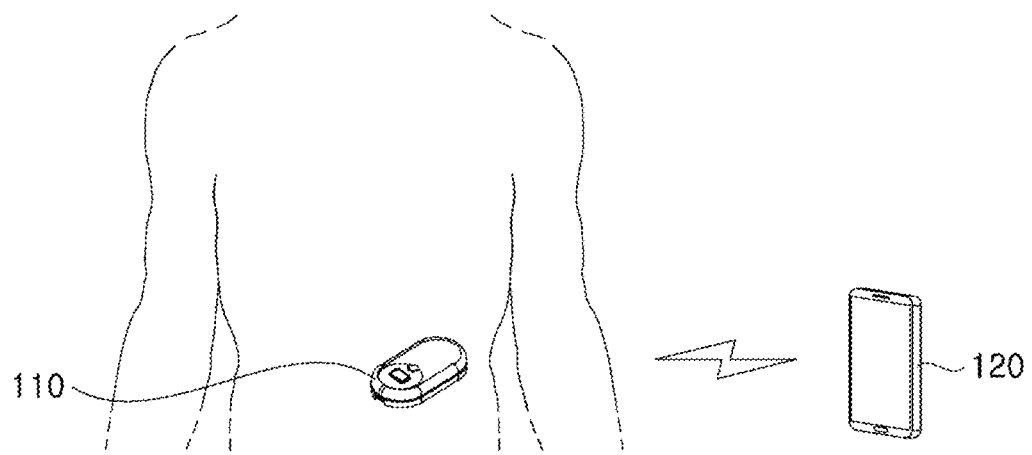
[Fig. 2]
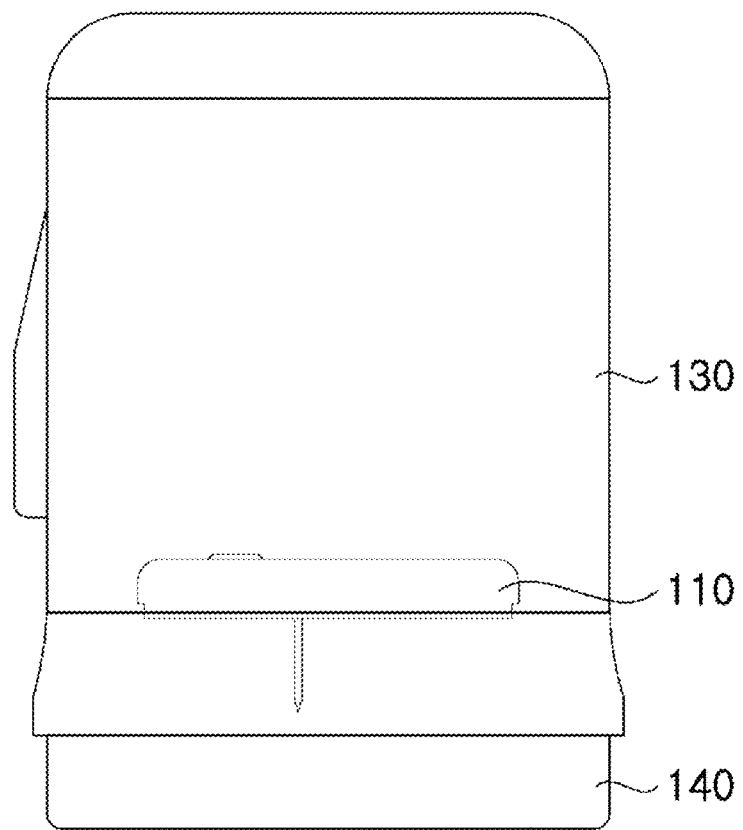

[Fig. 3]
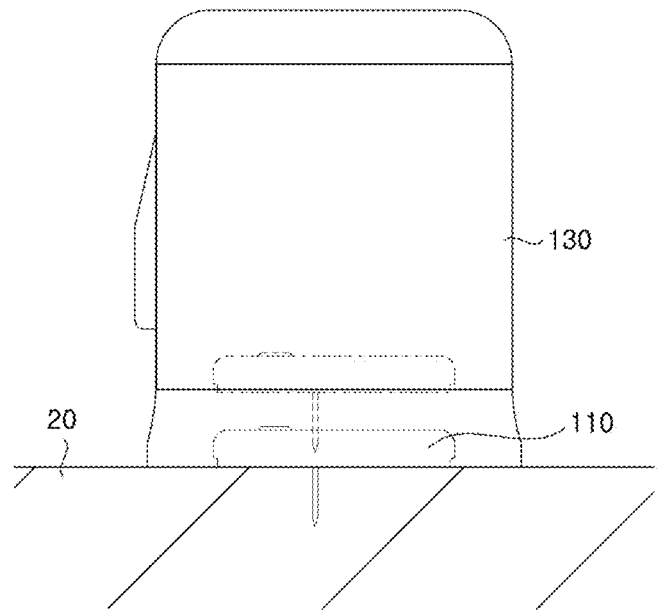
[Fig. 4]
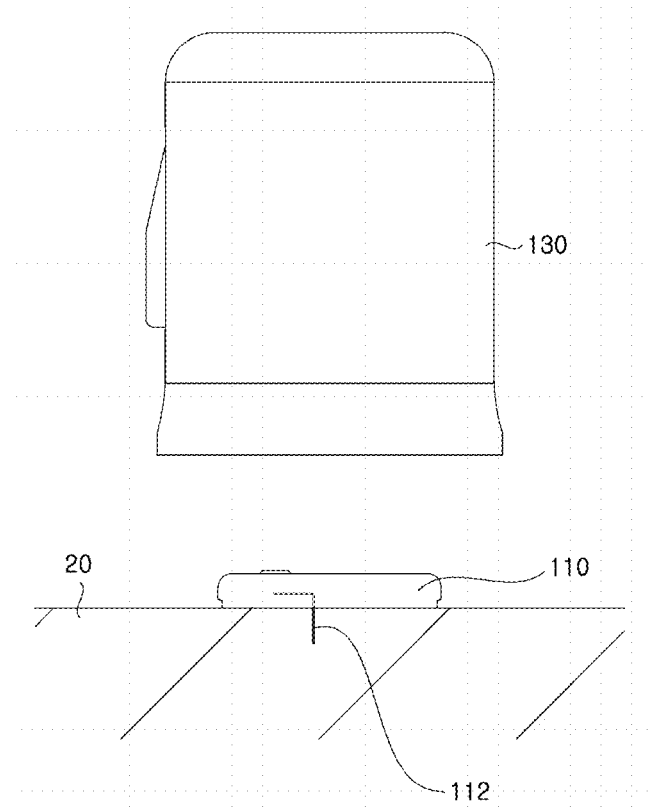

[Fig. 5]
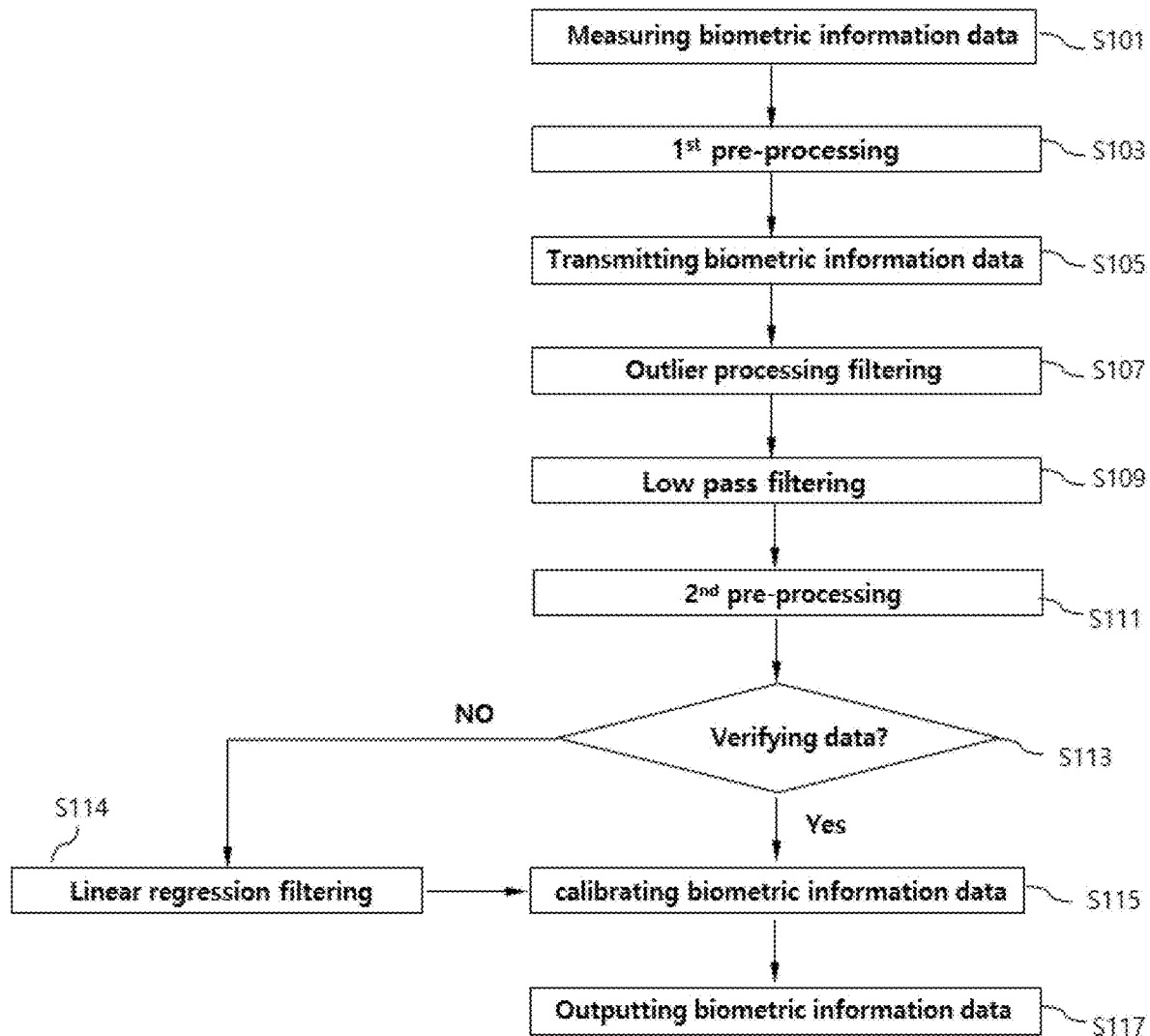

[Fig. 6]
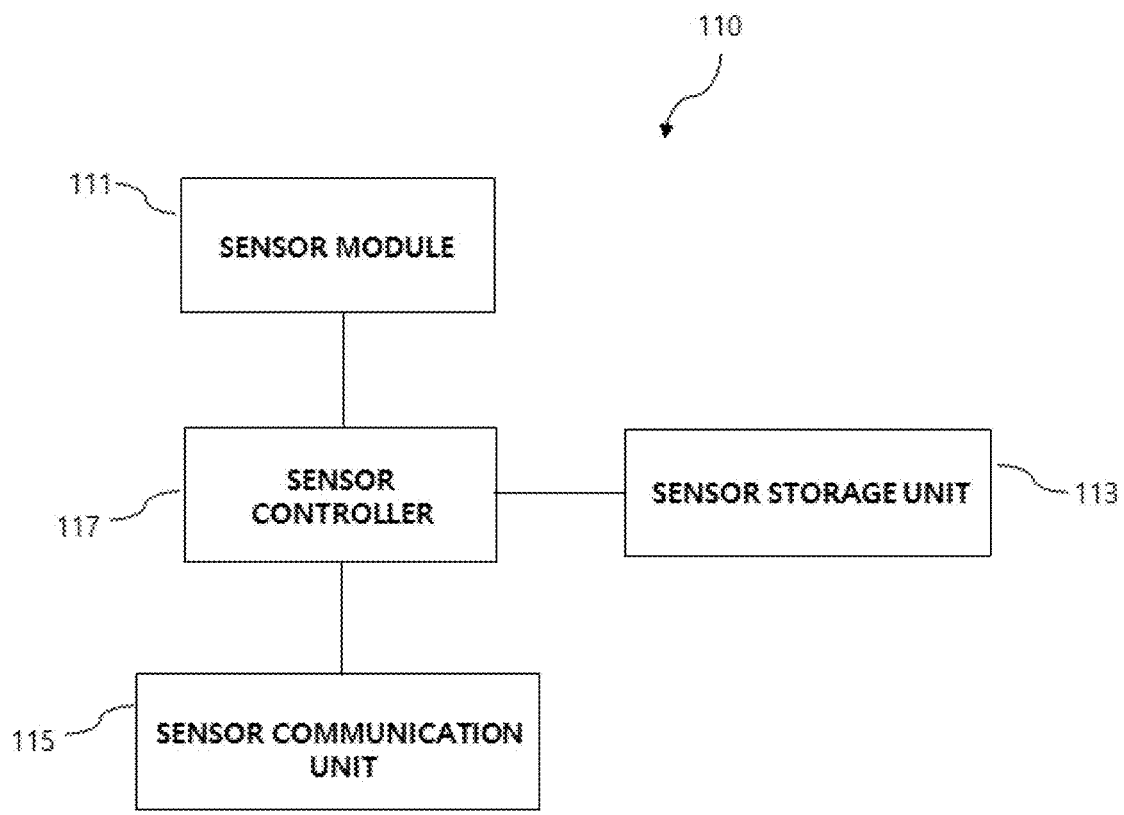

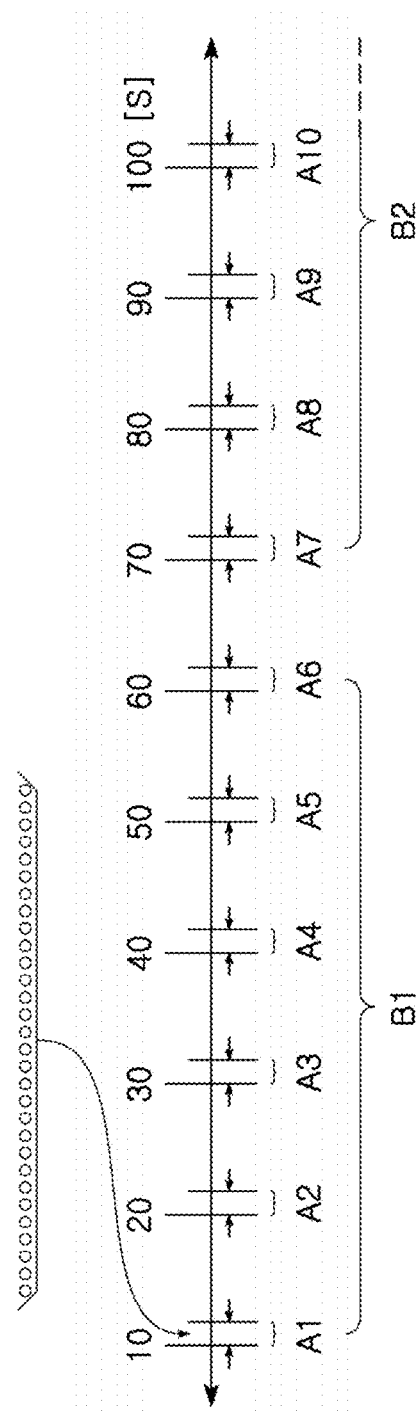

[Fig. 8]
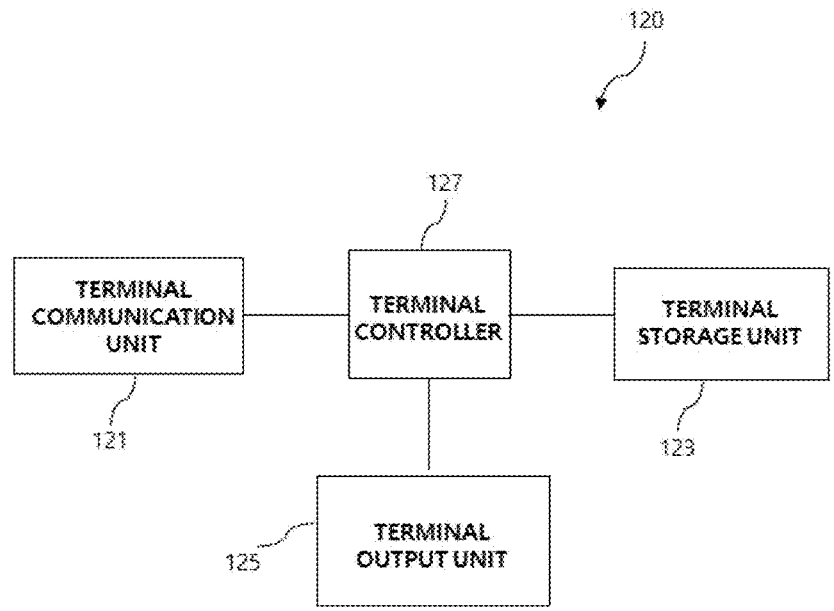
[Fig. 9]
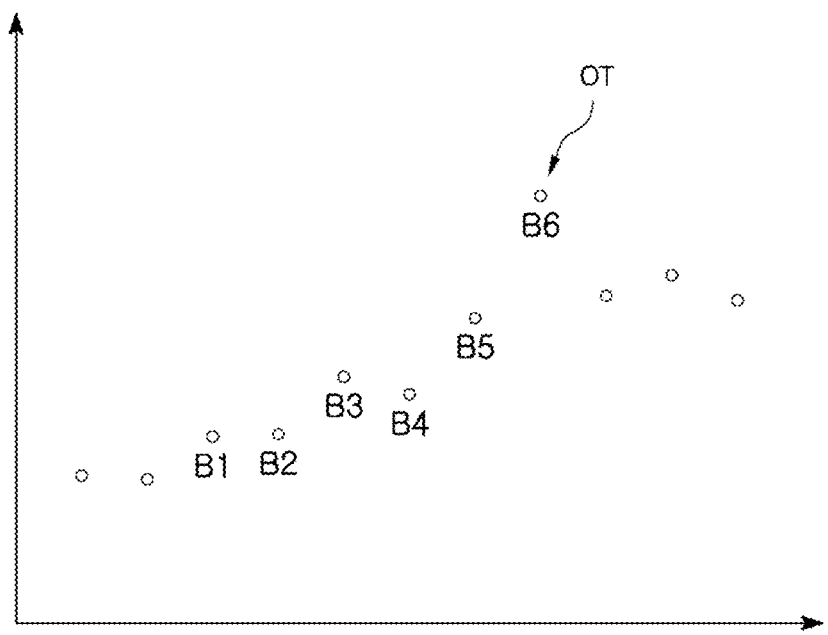

[Fig. 10]
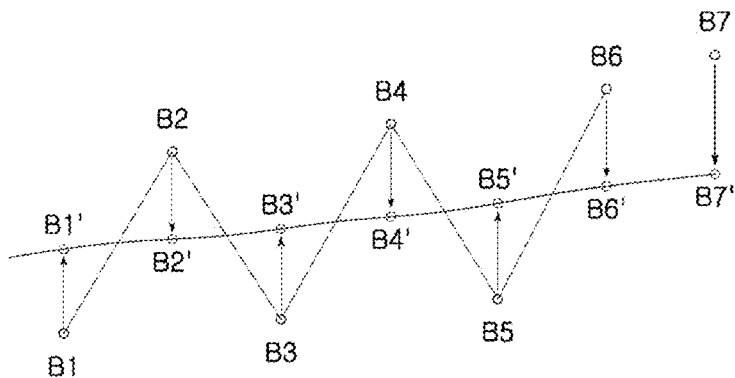
[Fig. 11]
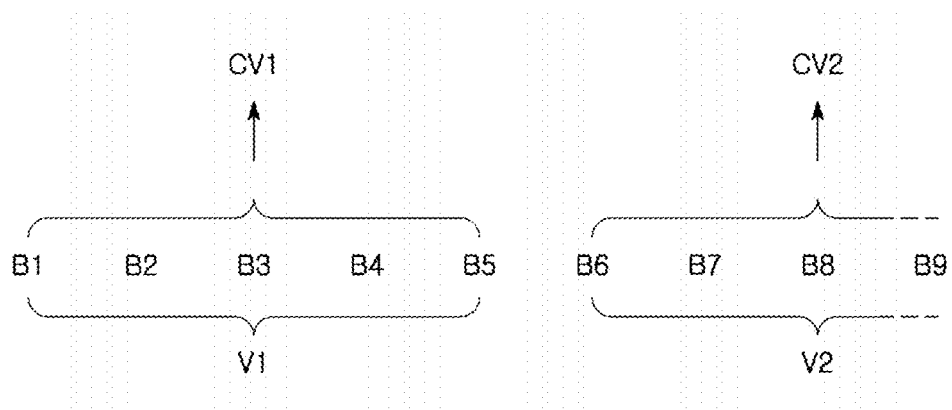
[Fig. 12]
CV1    ⟶    V1 [X]
———————————— TH1
CV1    ⟶    V1 [O]
———————————— TH2
CV1    ⤑    V1 [X]

[Fig. 13]
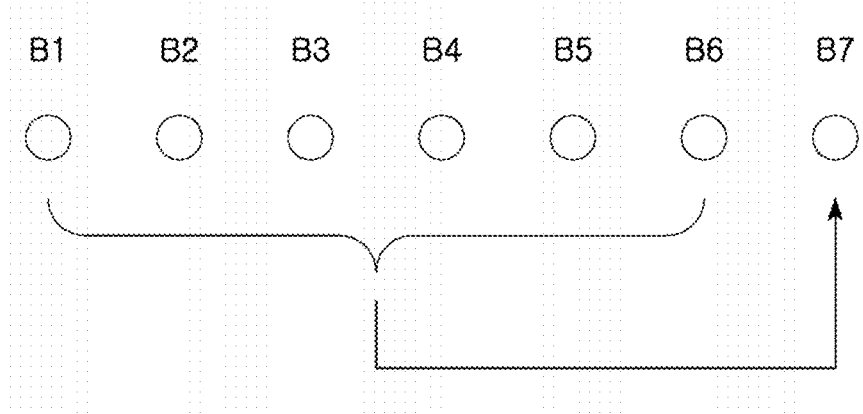
[Fig. 14]
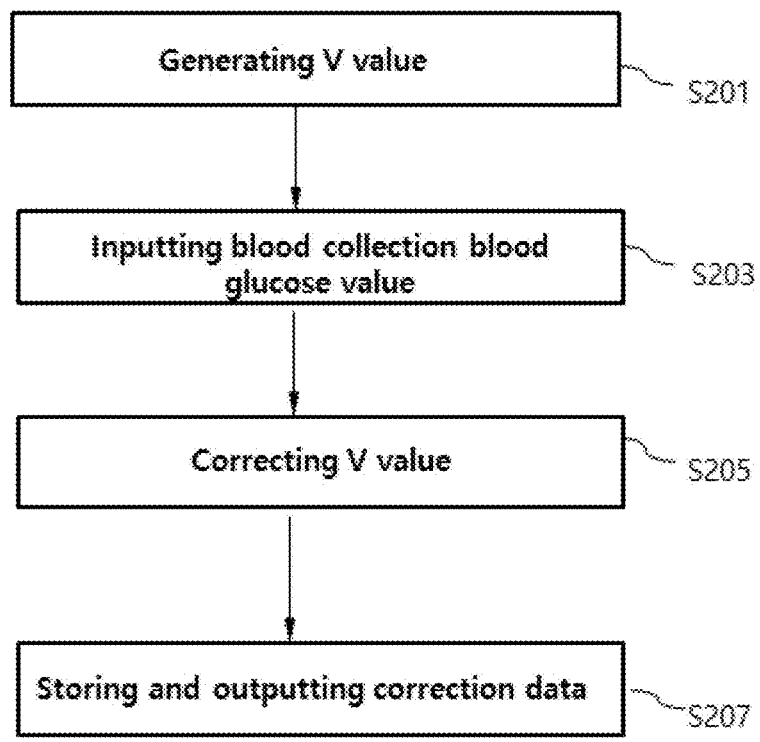

METHOD FOR PROCESSING NOISE OF BIOMETRIC INFORMATION MEASUREMENT DATA

CROSS-REFERENCE TO RELATED APPLICATIONS

The present application is the U.S. National Phase of PCT Application No. PCT/KR2020/003708 filed on Mar. 18, 2020, which claims the priority to Korean Patent Application No. 10-2019-0095961 filed on Aug. 7, 2019, the entire contents of which are incorporated herein by reference.

TECHNICAL FIELD

The present disclosure generally relates to a method for processing noise of biometric information measurement data, in more detail, a method for processing noise of biometric information measurement data which can remove various noise included in the biometric information data during the process of measuring biometric information of human body in a continuous blood glucose monitoring system, thereby improving accuracy of the measured biometric information.

BACKGROUND

Diabetes is a major cause of death and a cause of disability worldwide, and therefore, many people have health problems due to diabetes. Specially, diabetes is a serious disease that causes heart and kidney disease, blindness, nerve damage and high blood pressure. According to a long-term clinical study, the incidence of complications can be significantly reduced by appropriately managing blood glucose levels. Therefore, it is important to continuously manage diabetes, an important factor is self-monitoring of blood glucose levels.

In response to this demand, a self-diagnosis biometer in which a user can check a blood glucose level of the user by himself or herself has been widely distributed and used. A conventional blood glucose meter measures the blood glucose level of the user by putting the user's blood on a sensor strip, which is a test strip. Accordingly, the sensor strip with the blood is inserted into the blood glucose meter, and the blood glucose level measured through the sensor strip is displayed on the blood glucose meter.

At this time, the blood glucose meter receives an electrical signal generated by an electrochemical reaction between the collected blood and the reactant in the sensor strip, and measures the blood glucose level. Such a finger prick method helps diabetic patients to manage blood glucose, but it is difficult to accurately identify the blood glucose levels which are being frequently changed because it shows only the result at the time of the measurement.

Diabetics patients generally experience hyperglycemia and hypoglycemia, an emergency may occur in the hypoglycemic conditions, and the patients may become unconscious or die if a hypoglycemic condition lasts for an extended period of time without the supply of sugar. Accordingly, although rapid discovery of the hypoglycemic condition is critically important for diabetics, blood-collecting type glucose monitoring devices intermittently measuring glucose have limited ability to accurately measure blood glucose levels.

To overcome such a drawback, continuous glucose monitoring systems (CGMSs) inserted into the human body to measure a blood glucose level every few minutes have been developed, and therefore easily perform the management of diabetics and responses to an emergency situation.

The continuous blood glucose measurement system measures biometric information of blood glucose by collecting test substance such as blood of human body in a state that a part of a sensor is inserted in the human body. For this, a sensor transmitter measuring biometric information in a state of being attached to the human body and a communication terminal receiving the measured biometric information data from the sensor transmitter are comprised.

At that time, because measurement regarding biometric information in a state that the sensor transmitter is attached to the human body and a part of a sensor is inserted to the human body is performed, the human body may recognize the sensor inserted into the human body as foreign substance and, because of this, noise can be generated on the biometric information data measured by the sensor transmitter. Accordingly, the sensor transmitter performs a stabilization process for a certain time if initial attachment of the sensor transmitter is performed.

However, after the initial stabilization process is performed, the noise can be included in the measured biometric information data. For example, because a part of the sensor is inserted to the human body, the sensor can be moved every time the human body moves, and the noise may be included in the biometric information data measured by the sensor transmitter in response to the movement of the sensor.

Or, when the biometric information data is transmitted from the sensor transmitter to the communication terminal, noise may be included in the biometric information data received by the communication terminal due to the effect of an electromagnetic pulse and the like which can affect the transmission.

For processing noise included in biometric information data, conventional art uses algorithm consisting of a noise filter step for reducing and removing noise from biometric information data measured by a sensor transmitter, an average extraction step for extracting a representative value from the biometric information data measured for a certain time period and a calibration step for time delay and accuracy improvement. However, if the noise is processed using this single algorithm, there is a problem in being difficult in responding various type noise.

DETAILED DESCRIPTION OF DISCLOSURE

Technical Problem

To solve the problem of the conventional art, the purpose of the present disclosure may be for providing a method for processing noise of biometric information measurement data which, because various noise may be included in biometric information data measured by a sensor transmitter and additional noise can be added while the biometric information data is being transmitted from a body attachable unit to a communication terminal, can remove the added noise and acquire accurate biometric information.

Solution to Problem

According to an embodiment of the present disclosure, a method for processing noise of biometric information measurement data, may comprise: measuring biometric information, by a sensor transmitter configured to measure biometric information of a user; transmitting data of the measured biometric information from the sensor transmitter to a communication terminal; processing noise from the data of the biometric information transmitted to the communication terminal; and outputting, on the communication terminal, the data of the biometric information of which noise is processed.

The method further comprising processing the noise from data of the biometric information measured by the sensor transmitter, wherein the data of the biometric information transmitted to the communication terminal is biometric information data of which noise is processed by the sensor transmitter.

Processing the noise of the biometric information data by the sensor transmitter comprises processing the noise of the biometric information data by processing an average of a plurality of biometric information data measured a certain time period.

The processing of the noise of the biometric information data by the sensor transmitter comprises processing the noise of the biometric information data by deleting top value datum or data and bottom value datum or data from the plurality of biometric information data and calculating an average value of remaining data of the plurality of biometric information data.

The noise of the data of the biometric information transmitted from the sensor transmitter is processed by performing one or more of outlier processing filtering, low pass filtering, pre-processing and linear regression filtering.

The outlier processing filtering performed by the communication terminal determines whether one of data is an outlier value or not using a plurality of data before the one of the data with respect to the one of the data, and processing by deleting the determined outlier value.

The determining of whether the one of the data is the outlier value or not comprises determining whether the one of the data is the outlier value or not using any one of an average gradient, a gradient change value, and an average and a standard deviation of the plurality of data before the one of the data.

The low pass filtering performed by the communication terminal sets a weight applied to one of data using weights applied to a plurality of data before the one of the data with respect to the one of the data.

The pre-processing calculates a trimmed average value calculated by removing top value datum or data and bottom value datum or data from the data of the biometric information received from the sensor transmitter and calculating an average value of remaining data of the biometric information received from the sensor transmitter.

The method further comprises verifying the data of the biometric information processed by performing the pre-processing, wherein verification of the data of the biometric information is performed by calculating a verification value using the data of the biometric information received from the sensor transmitter, setting a verification range regarding the verification value, and verifying the data of the biometric information processed by performing the pre-processing when the verification value is within the verification range.

The method may further comprise, if the data of the biometric information is not verified, performing the linear regression filtering on the data of the biometric information received from the sensor transmitter, wherein the linear regression filtering performs, with respect to one of the data of the biometric information received from the sensor transmitter, filtering on the one of data using a plurality of data before the one of data.

The outputting, on the communication terminal, the data of the biometric information comprises the data of the biometric information processed by the linear regression filtering.

The outputting, on the communication terminal, the data of the biometric information comprises, when the data of the biometric information is verified, outputting the data of the biometric information processed by the pre-processing on the communication terminal.

The method further comprises performing calibration on the data of the biometric information of which noise is processed using biometric information data acquired through blood collection, wherein the outputting, on the communication terminal, the data of the biometric information comprises outputting the calibrated data of the biometric information on the communication terminal.

Advantageous Effects of Invention

An embodiment of the present disclosure has advantageous technical effect in which accurate biometric information data can be provided by removing various types of noise included in biometric information data by processing a step for noise removal by stages using various algorism.

BRIEF DESCRIPTION OF THE DRAWINGS

FIG. 1 is a schematic diagram for illustrating a continuous blood glucose measurement system according to an embodiment of the present disclosure.

FIG. 2 is a figure illustrating an applicator for attaching a sensor transmitter to a part of a human body according to an embodiment of the present disclosure.

FIGS. 3 and 4 are figures for illustrating a process of attaching a sensor transmitter to a human body using an applicator according to an embodiment of the present disclosure.

FIG. 5 is a flowchart for illustrating a method for processing noise of biometric measurement data according to an embodiment of the present disclosure.

FIG. 6 is a block diagram for illustrating a sensor transmitter of a continuous blood glucose measuring system according to an embodiment of the present disclosure.

FIG. 7 is a figure for illustrating a pre-processing process performed in a sensor transmitter by a biometric information measurement data noise processing method according to an embodiment of the present disclosure.

FIG. 8 is a block diagram for illustrating a communication terminal of a continuous blood glucose monitoring system according to an embodiment of the present disclosure.

FIG. 9 is a figure for illustrating a filtering process for processing an outlier value of a biometric information measurement data noise processing method according to an embodiment of the present disclosure.

FIG. 10 is a figure for illustrating a low pass filtering process of a biometric information measurement data noise processing method according to an embodiment of the present disclosure.

FIG. 11 is a figure for illustrating a pre-processing process performed by a communication terminal of a biometric information measurement data noise processing method according to an embodiment of the present disclosure.

FIG. 12 is a figure for illustrating a process verifying blood glucose information data transmitted to a communication terminal in a biometric information measurement data noise processing method according to an embodiment of the present disclosure.

FIG. 13 is a figure for illustrating a linear regression filtering process of a biometric information measurement data noise processing method according to an embodiment of the present disclosure.

FIG. 14 is a figure for illustrating a process for calibrating blood glucose information data of a biometric information measurement data noise processing method according to an embodiment of the present disclosure.

DESCRIPTION OF EMBODIMENTS OF DISCLOSURE

With reference to enclosed drawings, preferred embodiments of the present disclosure are described in detail.

The technical terms used in the present disclosure are only for the purpose of describing exemplary embodiments, and they are not intended to limit the present invention. Also, unless otherwise defined, all technical terms used herein should be construed as having the same meaning as commonly understood by those skilled in the art, and should not be interpreted as being excessively inclusive or excessively restrictive. In addition, when a technical term used herein is an erroneous technical term that does not accurately represent the idea of the present invention, it should be understood as replacing the term by a technical term which can be properly understood by those skilled in the art.

Further, singular expressions used in the present specification include plural expressions unless they have definitely opposite meanings. In the present application, it shall not be construed that terms, such as "including" or "comprising", various constituent elements or steps described in the specification need to be all essentially included, and it shall be construed that some constituent elements or steps among the various constituent elements or steps may be omitted, or additional constituent elements or steps may be further included.

Also, it should be noted that the accompanying drawings are merely illustrated to easily explain the spirit of the invention, and therefore, they should not be construed to limit the spirit of the invention by the accompanying drawings.

Hereinafter, with reference to the enclosed drawings, a method for stabilizing a continuous blood glucose monitoring system according to an embodiment of the present disclosure is described in detail.

FIG. 1 is a schematic diagram for illustrating a continuous blood glucose measurement system according to an embodiment of the present disclosure.

Referring to FIG. 1, the continuous blood glucose measurement system according to an embodiment of the present disclosure comprises a sensor transmitter (110) and a communication terminal (120).

The sensor transmitter (110) is attachable to human body and, when the sensor transmitter (110) is attached to the human body, an end portion of a sensor of the sensor transmitter (110) is inserted into skin to periodically extract body fluid of the human body and measure blood glucose.

The communication terminal (120) is a terminal configured to receive blood glucose information from the sensor transmitter (110) and output or display the received blood glucose information to a user, and for example, the communication terminal (120) may be a portable terminal (such as smartphone, tablet PC, or notebook and so on) configured to communicate with the sensor transmitter (110). However, the communication terminal (120) is not limited thereto, and may be any type of a terminal which has a communication function and program or application can be installed to.

The sensor transmitter (110) transmits the blood glucose information in response to request of the communication terminal (120) or at predetermined times periodically, and for data communication between the sensor transmitter (110) and the communication terminal (120), the sensor transmitter (110) and the communication terminal (120) are communicationally connected to each other over a wire by an USB cable and so on or communicationally connected in an wireless communication means such as infrared communication, NFC communication, Bluetooth, etc.

The sensor transmitter (110) is attached to a part of the human body by an applicator, FIG. 2 is a figure illustrating an applicator for attaching a sensor transmitter to a part of a human body according to an embodiment of the present disclosure, and FIGS. 3 and 4 are figures for illustrating a process of attaching a sensor transmitter to a human body using an applicator according to an embodiment of the present disclosure.

Firstly, an applicator (130) is now described by referring to FIG. 2, the sensor transmitter (110) is mounted in the applicator (130), and the applicator (130) can be operated so that the sensor transmitter (110) can be outwardly discharged to the outside of the applicator (130) by the manipulation of the user and then be attached to a specific portion of the human body of the user. The applicator (130) is formed to have a shape that one side of the applicator (130) is open, and the sensor transmitter (110) is installed to the applicator (130) through the open side of the applicator (130).

When the sensor transmitter (110) is attached to a part of the human body using the applicator (130), for inserting an end portion of the sensor included in the sensor transmitter (110) to skin, the applicator (130) comprises a needle (not shown) formed to cover the end portion of the sensor therein, a first elastic means (not shown) pushing the needle and the end portion of the sensor together towards the skin, and a second elastic means (not shown) configured to retract the needle only. The compressed state of the first elastic means (not shown) arranged to be compressed inside the applicator (130) by the configuration of the applicator (130) can be released, thereby inserting the needle and the end portion of the sensor simultaneously to the skin, and when the end portion of the sensor is inserted to the skin, the compressed state of the second elastic means (not shown) is released, thereby extracting the needle only. By the applicator (130), the user can safely and easily attach the sensor transmitter (110) to the skin.

A process of attaching the sensor transmitter (110) to the human body will be described in detail with reference to FIGS. 3 and 4, in a state that a protection cap (140) is separated or removed, an open side of the applicator (130) is closely placed on a specific part of skin (20) of the human body. When the applicator (130) is operated in a state that the applicator (130) is closely placed on the skin (20) of the human body, the sensor transmitter (110) is outwardly discharged from the applicator (130) and then attached to the skin (20). Here, an end portion of the sensor (112) is arranged to be exposed from the sensor transmitter (110) at a lower portion of the sensor transmitter (110), and a part of the end portion of the sensor (112) is inserted into the skin (20) by a needle installed at the applicator (130). Accordingly, the sensor transmitter (110) can be attached to the sensor (20) in a state that an end portion of the sensor (112) is inserted to the skin (20).

In the embodiment of the present disclosure, an adhesive tape is provided at a surface of the sensor transmitter (110) contacting the human body so that the sensor transmitter (110) can be attached to the skin (20). Accordingly, if the applicator (130) is moved away from the skin (20) of the human body, the sensor transmitter (110) is fixedly attached to the skin (20) of the human body by the adhesive tape.

After that, if the power is supplied to the sensor transmitter (110), the sensor transmitter (110) is communicationally connected with the applicator (130), and the sensor transmitter (110) transmits the measured blood glucose information to the communication terminal.

The sensor transmitter (110) can measure not only the blood glucose information but also various biometric information, and hereinafter blood glucose information is illustrated as one of examples of biometric information.

FIG. 5 is a flowchart for illustrating a method for processing noise of biometric measurement data according to an embodiment of the present disclosure.

Referring to FIG. 5, a process of removing noise from blood glucose information data measured by the sensor transmitter (110) of the continuous blood glucose monitoring system (100). This embodiment is described with reference to the drawings illustrated in FIGS. 1 to 4.

When the sensor transmitter (110) is attached to the human body, a part of a sensor included in the sensor transmitter (110) is inserted to the human body. And, the inserted sensor measures blood glucose information of blood glucose and so on from test substance of the human body (S101). At that time, the measurement of the blood glucose information performed by the sensor transmitter (110) can be performed for every certain time period.

If the measurement of the blood glucose information is performed by the sensor transmitter (110), a first pre-processing process of the measured blood glucose information data is performed (S103). The first pre-processing process is one of processes for processing noise in the blood glucose information data measured by the sensor transmitter (110), and performed in the sensor transmitter (110).

The first pre-processing process processes noise by calculating an average value of the measured blood glucose information data, and, for example, the average value used in the first pre-processing process may be a trimmed average value which is calculated by removing a certain proportion of a top portion and a bottom portion of the measured blood glucose information data and then calculating an average of the remaining data. However, it is not limited thereto, and any one of population mean, sample mean, weighted average, geometric average, harmonic average and generalized average can be used.

The blood glucose information data processed by the first pre-processing process is transmitted from the sensor transmitter (110) to the communication terminal (120) (S105). In this step, the blood glucose information data transmitted to the communication terminal (120) can be data of the trimmed average value.

The communication terminal (120) performs an outlier processing filtering process to the trimmed average value blood glucose information data transmitted to the communication terminal (120) (S107). The outlier processing filtering is a process for searching for data which is out of one or more certain conditions among the plurality of data and processing that data.

The blood glucose information data which is processed by the outlier processing filtering can be further processed by low pass filtering (S109). The low pass filtering process may be a process for removing components corresponding to a high band and leaving components corresponding to a low band only.

A second pre-processing process can be performed to the blood glucose information data processed by the low pass filtering (S111). Unlike the first pre-processing process, the second pre-processing process is performed by the communication terminal (120), and is performed by calculating an average value of the blood glucose information data processed by the low pass filtering. In this embodiment, like the first pre-processing process, a trimmed average value can be used in the second pre-processing process.

The second pre-processing process can be performed by using the plurality of data among the blood glucose information data processed by the low pass filtering.

After that, it is determined whether the blood glucose information data processed by the second pre-processing process can be trusted (S113). This is a step for verifying whether the blood glucose information data processed by the second pre-processing process can be trusted. In this step, verification data is generated using the blood glucose information data processed by the low pass filtering, and if the generated verification data is within a set range, it is determined that the blood glucose information data processed by second pre-processing process can be trusted.

If the blood glucose information data processed by the second pre-processing process is verified as data which can be trusted, calibration to the verified blood glucose information data is performed (S115). The state in which a part of the sensor included in the sensor transmitter (110) is inserted to the human body is stably maintained for a use period of the sensor transmitter (110). Accordingly, the reaction of the human body caused by the sensor inserted to the human body can continuously occur, and because of this, raw data of the blood glucose information measured by the sensor transmitter (110) cannot be used as it is and needs to be calibrated. Accordingly, in this step, calibration to the blood glucose information data processed by the second pre-processing process is performed.

As described above, the blood glucose information data processed by the calibration to the blood glucose information data is outputted to or displayed on the communication terminal (120) (S117).

And, if the blood glucose information data processed by the second pre-processing process is not verified as data which can be trusted, a process of a linear regression filtering is performed to the blood glucose information data processed by the second pre-processing process (S114). The linear regression filtering process can change or transform a value of data using multiple past data with reference to one datum among the blood glucose information data processed by the second pre-processing process. Therefore, if the blood glucose information data is transformed by the linear regression filtering, the transformed blood glucose information data can be recognized as data which can be trusted.

The blood glucose information data recognized as data which can be trusted through the linear regression filtering can be calibrated through Step S115.

FIG. 6 is a block diagram for illustrating a sensor transmitter of a continuous blood glucose measuring system according to an embodiment of the present disclosure.

According to an embodiment of the present disclosure, referring to FIG. 6, the sensor transmitter (110) comprises a sensor module (111), a sensor storage unit (113), a sensor communication unit or communicator (115) and a sensor controller (117).

The sensor module (111) comprises a sensor (112), and a part of the sensor (112) is inserted into the human body to measure blood glucose information.

The sensor storage unit (113) stores data of the blood glucose information measured by the sensor module (111). At this embodiment, the blood glucose information data stored to the sensor storage unit (113) can be stored as digital signals.

The sensor communication unit (150) transmits the blood glucose information data stored to the sensor storage unit (113) to the communication terminal (120).

The sensor controller (117) controls the sensor module (111) to measure blood glucose information at a predetermined time interval. The sensor controller (117) transforms the blood glucose information data measured as analog signals into the digital signals, and the transformed digital signals of the blood glucose information data are stored to the storage unit. Additionally, the sensor controller (117) controls the sensor communication unit (115) to transmit the stored blood glucose information data to the communication terminal (120).

FIG. 7 is a figure for illustrating a pre-processing process performed in a sensor transmitter by a biometric information measurement data noise processing method according to an embodiment of the present disclosure.

Using FIG. 7, a first pre-processing process performed in the sensor transmitter (110) according to an embodiment of the present disclosure will be described in further detail.

Firstly, as described above, data of a biometric signal measured by the sensor module (111) are measured at every certain time period, and, for one time period for the measurement, multiple time measurement can be performed. For example, the sensor module (111) measures biometric signal data every ten (10) seconds. At that time, every time when one unit measurement is performed, biometric signals are measured thirty (30) times, and the time consumed for measuring the biometric signals may be one (1) second. Accordingly, the sensor module (111) measures thirty (30) analog biometric signal data every ten (10) seconds.

Accordingly, for example, blood glucose information can be measured every ten (10) seconds, such as thirty (30) times measurements of blood glucose information between 2 o'clock 14 minute 25 second and 2 o'clock 14 minute 26 second PM, and another thirty (30) times measurements of blood glucose information between 2 o'clock 14 minute 35 second and 2 o'clock 14 minute 36 second PM.

The measured biometric signal data is transformed into a digital signal by the sensor controller (117). The sensor controller (117) calculates one average value every ten (10) seconds by calculating an average value of thirty (30) blood glucose information data transformed to the digital signal by a trimmed average calculation way. At that time, seven (7) highest data and seven (7) lowest data among thirty (30) blood glucose information data are removed and an average value (A) of remaining sixteen (16) data is calculated.

The trimmed average value (A) can be generated every ten (10) seconds, and as illustrated, six (6) trimmed average values (A1 to A6) can be generated for one (1) minute.

As described above, the noise on the measured blood glucose information data can be removed by processing the measured blood glucose information data through the first pre-processing process.

Additionally, the first pre-processing process generates six (6) trimmed average values (A1 to A6) for one (1) minute, and generates a second trimmed average value (B1) using the generated six (6) trimmed average values (A1 to A6). At that time, the generated second trimmed average value (B1) is calculated by removing a maximum value and a minimum value among six (6) trimmed average values (A1 to A6) and calculating an average of remaining four values.

Accordingly, the first pre-processing process generates one second trimmed average value (B) for one (1) minute.

The blood glucose information data which is calculated as one second trimmed average value (B) for one (1) minute is stored at the sensor storage unit (113) by the sensor controller (117), and the stored blood glucose information data can be transmitted to the communication terminal (120) through the sensor communication unit (115). Therefore, the communication terminal (120) can receive the second trimmed average value (B) of the blood glucose information data measured for one (1) minute from the sensor transmitter (110). At that time, although in the present embodiment the communication terminal (120) can receive the second trimmed average value (B) of the measured blood glucose information data every minute, the present disclosure is not limited thereto, and five (5) measured blood glucose information data can be received every five (5) minutes.

FIG. 8 is a block diagram for illustrating a communication terminal of a continuous blood glucose monitoring system according to an embodiment of the present disclosure.

Referring to FIG. 8, the communication terminal (120) according to the present embodiment comprises a terminal communication unit (121), a terminal storage unit (123), a terminal output or display unit (125), and a terminal controller (127).

The terminal communication unit (121) communicates with the sensor communication unit (115) of the sensor transmitter (110), and receives the blood glucose information data through the sensor communication unit (115). At that time, the blood glucose information data received by the terminal communication unit (121) is blood glucose information data calculated as a trimmed average by the sensor transmitter (110), and may be a trimmed average value generated every minute.

The terminal storage unit (123) stores the blood glucose information data received by the terminal communication unit (121). And, the terminal storage unit (123) stores the blood glucose information data calculated and transformed or calibrated by the terminal controller (127).

The terminal output or display unit (125) outputs or displays the blood glucose information data in which various types of noise is processed by the terminal controller (125) so that the user can check it. At that time, the blood glucose information data outputted on the terminal output unit (125) may output the blood glucose information data with numerical values or in a form of graph.

The terminal controller (127) performs various processing processes to process noise in the blood glucose information data received from the sensor transmitter (110). In the present disclosure, the terminal controller (127) may perform outlier processing filtering, low pass filtering, second pre-processing, data verification, linear regression filtering, and calibration processing of blood glucose information data.

In the present embodiment, for outlier processing filtering, the terminal controller (127) searches for data, which is out of a certain range, among trimmed average values of the blood glucose information data transmitted from the sensor transmitter (110), and processes that data. At that time, if it is determined that data has an outlier, that data can be processed by being removed. However, the present disclosure is not limited thereto, and, if necessary, the data having the outlier is calibrated and used.

And, the terminal controller (127) can perform low pass filtering to the data having the outlier. The low pass filtering can remove components corresponding to a high band and leave components corresponding to a low band only.

Additionally, the terminal controller (127) can perform the second pre-processing using the data processed by the low pass filtering. The second pre-processing process processes by calculating an average value of the blood glucose information data processed by the low pass filtering, and a trimmed average value can be used.

The terminal controller (127) performs verification on the blood glucose information data processed by the second pre-processing process. At that time, the terminal controller (127) controls to output or display the blood glucose information data, which passes the verification and is processed by the calibration process, on the terminal output unit (125). And, the terminal controller (127) controls to output or display the blood glucose information data, which fails to pass the verification, is processed by the linear regression filing process, and then is processed by the calibration process, on the terminal output unit (125).

FIG. 9 is a figure for illustrating a filtering process for processing an outlier value of a biometric information measurement data noise processing method according to an embodiment of the present disclosure.

Referring to FIG. 9, a process for processing an outlier value for noise processing on blood glucose information measurement data received from the sensor transmitter (110) by the communication terminal (120) will be described. The communication terminal (120) determines a outlier value included in the blood glucose information data and processes the determined outlier value, and in the present embodiment, the determined outlier value is processed by being removed.

As illustrated, the communication terminal (120) determines whether specific datum is an outlier value or not using a plurality of past data with respect to one datum, in order to determine datum having an outlier value (OT). Accordingly, data of B1 to B5 are used for determining whether B6 is outlier value datum among data of B1 to B6.

At that time, an average gradient of B1 to B5 can be used in order to determine whether B6 is outlier value datum or not, and if the value of B6 is out of a certain range from the average gradient of B1 to B5, it is determined that B6 is an outlier value.

Alternatively, a gradient change value of B1 to B5 can be used in order to determine whether B6 is outlier value datum or not, and if the value of B6 is out of a certain range from the gradient change value of B1 to B5, it is determined that B6 is an outlier value.

Alternatively, an average and standard deviation of B1 to B5 can be used in order to determine whether B6 is outlier value datum or not. Therefore, if the value of B6 is out of the standard deviation of B1 to B5, it is determined that B6 is an outlier value.

If it is determined that B6 is datum having an outlier value, that datum can be processed by being removed. However, the present disclosure is not limited thereto, and if necessary, B6 having an outlier value can be calibrated to be within a range which values of B1 to B5 have and be used.

FIG. 10 is a figure for illustrating a low pass filtering process of a biometric information measurement data noise processing method according to an embodiment of the present disclosure.

Referring to FIG. 10, a low pass filtering process in which the communication terminal (120) performs a noise process on blood glucose information measurement data of which outlier value is processed will be described. The communication terminal (120) removes components corresponding to an high band from blood glucose information data and leaves data corresponding to a low band only.

For this, the communication terminal (120) sets a weight to each data of which outlier value is processed, and changes a value of each data. For setting a weight to each blood glucose information data, the communication terminal (120) sets a weight of each data using a plurality of past data with respect to one datum.

Accordingly, as illustrated, a weight set to B7 among data of B1 to B7 can be determined based on weights set to B1 to B6. FIG. 10 illustrates a state that values of B1 to B6 are changed to B1' to B6' by each weight set to each value of B1 to B6. Accordingly, a weight of B7 can be set using the values changed to B1' to B6'.

Accordingly, when the value of B7 is relatively large in comparison with the values of B1' to B6', a weight is set to lower the value of B7, and when the value of B7 is relatively small in comparison with the values of B1' to B6', a weight is set to make the value of B7 higher. Accordingly, the value of B7 can be changed to B7'.

As described above, components corresponding to high band can be removed by setting weights to each blood glucose information data and changing the blood glucose information data.

FIG. 11 is a figure for illustrating a pre-processing process performed by a communication terminal of a biometric information measurement data noise processing method according to an embodiment of the present disclosure.

Referring to FIG. 11, performance of a second pre-processing process in which the communication terminal (120) performs noise processing on blood glucose information data which is processed by low pass filtering will be described. The communication terminal (120) performs the second pre-processing process on the blood glucose information data, and the second pre-processing process can be performed in a similar way to the first pre-processing process.

For performing the second pre-processing process, the communication terminal (120) uses blood glucose information data which is processed by low pass filtering. At that time, the communication terminal (120) receives a trimmed average value of the measured blood glucose information data from the sensor transmitter (110) every minute, and at that time, five (5) trimmed average values (B1 to B5) are received from the sensor transmitter (110) at a five (5) minute unit. A processing on an outlier value and a low pass filtering processing are performed on the received trimmed average values.

Therefore, the communication terminal (120) performs the second pre-processing process on the trimmed average value which is processed by the low pass filtering. Accordingly, as illustrated, the communication terminal (120) performs the second pre-processing process on five (5) trimmed average values (B1 to B5) which are processed by low pass filtering. At that time, the second pre-processing process removes a maximum value and a minimum value among five (5) trimmed average values (B1 to B5) which are processed by low pass filtering, and calculates an average of three (3) remaining values. Accordingly, the second pre-processing process generates one trimmed average value (V1) every five (5) minutes.

The trimmed average value (V1) can be blood glucose information data outputted on the communication terminal (120), but verification of blood glucose information data which will be displayed as the trimmed average value (V1) needs to be performed before the trimmed average value (V1) is displayed on the communication terminal (120).

For verification of blood glucose information data displayed as a trimmed average value (V), the communication terminal (120) generates a verification value (CV1) using five (5) trimmed average values (B1 to B5) which are processed by low pass filtering.

FIG. 12 is a figure for illustrating a process verifying blood glucose information data transmitted to a communication terminal in a biometric information measurement data noise processing method according to an embodiment of the present disclosure.

Referring to FIG. 12, for verification of blood glucose information data displayed as a trimmed average value (V), the communication terminal (120) generates a verification value (CV1) using five (5) trimmed average values (B1 to B5) which are processed by low pass filtering, and sets a verification range (TH1, TH2) about the verification value (CV1). At that time, the verification value (CV1) and the verification range (TH1, TH2) can be a value and a range generated and set by numerous experiments. Accordingly, the verification value (CV1) can be generated and the verification range (TH1, TH2) can be set through numerous experiments so that blood glucose information data measured by a continuously blood glucose monitoring system (100) according to an embodiment of the present disclosure.

In the present embodiment, the communication terminal (120) generates the verification value (CV1) using five (5) trimmed average values (B1 to B5) which are processed by low pass filtering, and determines that the verification value (CV1) is within the verification range (TH1, TH2). Accordingly, if the verification value (CV1) is within the verification range (TH1, TH2), the trimmed average value (V1) generated based on five (5) trimmed average values (B1 to B5) can be recognized as being a value passing the verification.

If the verification on the trimmed average value (V1) generated based on five (5) trimmed average values (B1 to B5) is passed, the calibration to the generated trimmed average value (V1) is performed and then the communication terminal (120) displays the generated trimmed average value (V1) on the terminal output unit (125).

However, when the verification value (CV1) is out of the verification range (TH1, TH2), the trimmed average value (V1) generated based on five (5) trimmed average values (B1 to B5) cannot be recognized as a value passing the verification.

If the generated trimmed average value (V1) cannot pass the verification, the communication terminal (120) can additionally perform a filtering processing on the generated trimmed average value (V1).

FIG. 13 is a figure for illustrating a linear regression filtering process of a biometric information measurement data noise processing method according to an embodiment of the present disclosure.

Referring to FIG. 13, a linear regression filtering process performed when the generated trimmed average value (V1) cannot pass the verification will be described.

When the generated trimmed average value (V1) cannot pass the verification, the communication terminal (120) performs a linear regression filtering process, and the linear regression filtering process can be performed using a trimmed average value (B) processed by low pass filtering. According to the present disclosure, the linear regression filtering process performs filtering on one datum using a plurality of past data with respect to one datum. Accordingly, for performing filtering on B7 among data of B1 to B7, data of B1 to B6 is used. This linear regression filtering process performs filtering one datum using six (6) past data for filtering one datum.

And, as described above, if the linear regression filtering process is performed on all data, a trimmed average value (V1) is generated through the second pre-processing process using five (5) blood glucose information data (B1 to B5) processed by the linear regression filtering again.

And, the communication terminal (120) calibrates the blood glucose information data (B1 to B5) processed by the linear regression filtering and displays the calibrated blood glucose information data on the terminal out unit (125).

FIG. 14 is a figure for illustrating a process for calibration blood glucose information data of a biometric information measurement data noise processing method according to an embodiment of the present disclosure.

Referring to FIG. 14, a process for calibration blood glucose information data according to the present embodiment will be described.

As described above, the blood glucose information data outputted on the communication terminal (120) may be blood glucose information data (V1) generated by performing the second pre-processing process on the blood glucose information data (B1 to B5) processed by low pass filtering, or blood glucose information data (V1) generated by the second pre-processing process on the blood glucose information data (B1 to B5) processed by linear regression filtering.

The generated blood glucose information data (V1) can be displayed on the communication terminal (120) as it is. However, according to the present disclosure, the continuous blood glucose monitoring system (100) measures blood glucose information of the human body in a state that a sensor is inserted to the human body, but biological reaction to the sensor in the human body can continuously occur due to the sensor's insertion to the human body.

Accordingly, calibration for the biological reaction continuously occurring needs to be performed. According to the present embodiment, a blood collection blood glucose value measured using a blood collecting type blood glucose device periodically can be used for the calibration for the biological reaction.

Therefore, as illustrated, blood glucose information data (V) generated using the blood glucose information data (B1 to B5) processed by low pass filtering, or blood glucose information data (V) generated using blood glucose information data (B1 to B5) processed by linear regression filtering is generated (S201). And, a blood collection blood glucose value measured using a blood collecting type blood glucose device is inputted to the communication terminal (120) (S203).

Accordingly, the communication terminal (120) calibrates the blood glucose information data (V) generated at step S201 using the inputted blood collection blood glucose value (S203). At that time, the calibration to the blood glucose information data (V) can perform calibration so as to correspond to the measured blood collection blood glucose value, but the present disclosure is not limited thereto, and if necessary, the calibration can be performed using relation between the measured blood collection blood glucose value and the generated blood glucose information data (V).

Like this the communication terminal (120) stores the blood glucose information data (V) calibrated with the blood collection blood glucose value, and display it through the terminal output unit (125).

As described above, the foregoing detailed descriptions regarding the present disclosure have been presented by way of exemplary embodiments, but the detailed exemplary embodiments are presented as preferred examples, and therefore it should be understood that the present disclosure shall not be limited to those exemplary embodiments, and the scope of the present disclosure shall be defined by the Claims and all of their equivalents fall within the scope of the present disclosure.

What is claimed is:

1. A method for processing noise of glucose level measurement data, by a continuous blood glucose measurement system including a sensor transmitter and a communication terminal communicating with each other, the method comprising:
measuring a glucose level, by the sensor transmitter configured to periodically measure the glucose level of a user;
generating, by the sensor transmitter, a first noise processed data by processing noise of data of the glucose level;
transmitting the first noise processed data of the glucose level from the sensor transmitter to the communication terminal;
generating, by the communication terminal, a second noise processed data by processing noise of the first noise processed data;
verifying, by the communication terminal, the second noise processed data when a verification value is within a verification range, the verification value calculated using the first noise processed data;
performing a linear regression filtering on the second noise processed data if the second noise processed data is not verified, by the communication terminal; and
outputting, on the communication terminal, the second noise processed data when the second noise processed data is verified, or data processed by the linear regression filtering.

2. The method for processing the noise of the glucose level measurement data according to claim 1, wherein the generating the first noise processed data by the sensor transmitter comprises processing the noise of the glucose level data by processing an average of a plurality of glucose level data measured for a certain time period.

3. The method for processing the noise of the glucose level measurement data according to claim 2, wherein the generating the first noise processed data by the sensor transmitter comprises processing the noise of the glucose level data by deleting top value datum or data and bottom value datum or data from the plurality of glucose level data and calculating an average value of remaining data of the plurality of glucose level data.

4. The method for processing the noise of the glucose level measurement data according to claim 1, wherein the generating the second noise processed data by the communication terminal is processed by performing one or more of outlier processing filtering, low pass filtering, pre-processing and linear regression filtering.

5. The method for processing the noise of the glucose level measurement data according to claim 4, wherein the outlier processing filtering performed by the communication terminal determines whether one data point of the plurality of glucose level measurement data is an outlier value or not using a plurality of glucose level measurement data before the one data point of the plurality of glucose level measurement data with respect to the one data point of the plurality of glucose level measurement data, and processing by deleting the determined outlier value.

6. The method for processing the noise of the glucose level measurement data according to claim 5, wherein the determining of whether the one data point of the plurality of glucose level measurement data is the outlier value or not comprises using any one of an average gradient, a gradient change value, and an average and a standard deviation of the plurality of data before the one data point of the plurality of glucose level measurement data.

7. The method for processing the noise of the glucose level measurement data according to claim 4, wherein the low pass filtering performed by the communication terminal sets a weight applied to one data point of the plurality of glucose level measurement data using weights applied to a plurality of glucose level measurement data before the one data point of the plurality of glucose level measurement data with respect to the one data point of the plurality of glucose level measurement data.

8. The method for processing the noise of the glucose level measurement data according to claim 4, wherein the generating the second noise processed data by the sensor transmitter comprises calculating a trimmed average value calculated by removing top value datum or data and bottom value datum or data from the first noise processed data received from the sensor transmitter and calculating an average value of remaining data of the first noise processed data received from the sensor transmitter.

9. The method for processing the noise of the glucose level measurement data according to claim 1, further comprising performing calibration on the data of the glucose level of which noise is processed using glucose level data acquired through blood collection, and outputting, on the communication terminal, the calibrated data of the glucose level on the communication terminal.

10. The method for processing the noise of the glucose level measurement data according to claim 1, wherein the verification value is calculated based on a plurality of first noise processed data received at different times from the sensor transmitter.

* * * * *